Patented July 19, 1938

2,124,384

UNITED STATES PATENT OFFICE 2,124,384

FLOOR TILE AND PROCESS OF MAKING SAME

Carleton Ellis, Montclair, N. J., assignor to Ellis-Foster Company, a corporation of New Jersey No Drawing. Application June 20, 1935, Serial No. 27,539

3 Claims. (Cl. 106—7)

This invention relates to floor tile containing sulphur, or more particularly resinated sulphur, as a binder for fillers, the composition being preferably pigmented or dyed to the desired color and pressed, sheeted or rolled while in a plastic condition into the form of sheets, blocks or squares of suitable size.

As stated in several of my patents and patent applications, sulphur which normally on cooling tends to yield a dense material of a generally crystalline character may be incorporated with a sulphur resin, such as is produced by reacting a phenol with sulphur chloride or with sulphur, and the resulting composition, if an adequate amount of the sulphur resin (e. g., usually above about 10 per cent, based on the amount of sulphur) is present, does not crystallize but shows on breaking a fracture which is smooth and free from crystallinity. Moreover the comparatively light color of sulphur or a resinated sulphur permits a considerable number of pigments, dyed fillers, lakes or dyes, to be used which individually create characteristic and desirable colorations of the sulphur mixture.

Sulphur generally has substantially no odor. Some sulphur resins, however, have quite noticeable odors which, of course, must be eliminated if these resins are to be used as domestic flooring compositions. Phenol-sulphur resins usually have a milder odor than phenol-sulphur chloride resins. Certain other sulphur plastics which are miscible with elemental sulphur, such as the polyethylene polysulphides, have a very pronounced odor and are less suitable for indoor use, although for special applications they are advantageous on account of their high resistance to solvents. Other sulphur-compatible resins include those made by polymerizing vinyl derivatives. Although odorless and of light color, such resins are not suited for present purposes for economic reasons.

Sulphur which has been mixed with a sulphur-phenol resin would normally have a slightly "chemical" odor which I prefer to eliminate in the present composition. One way in which this can be done fairly effectively is to make a sulphur-phenol resin by reacting elemental sulphur and phenol, cresol, and the like, in the presence of a small amount of an alkaline catalyst to introduce in that manner as much sulphur in combined form as is possible and finally to treat that product with sulphur chloride in relatively small quantity to introduce an additional component of sulphur adequate to create the necessary solubility of the sulphur resin in the sulphur of the final floor tile binder stock. That is, although the phenol-sulphur resin is not freely miscible with sulphur, a small amount of sulphur chloride serves to solubilize the resin and the low proportion of sulphur chloride thus utilized does not impart appreciable odor to the final mix. Resins made from sulphur and the higher phenols (cresols and xylenols) are more miscible with added sulphur and require lower proportions of sulphur chloride to bring about miscibility. I use the term "sulphur-chloridized phenol-sulphur resins" to distinguish the resins produced in accordance with this paragraph.

It also aids in removal of odor if the resinated sulphur (i. e. blend of sulphur and resin) is blown with steam or a current of an inert gas at a moderately high temperature for a considerable period of time. Deodorization is important in compositions which are to be used for flooring purposes (especially indoors), as any odor emanating from an expanse of floor in a closed room soon becomes obnoxious.

Sulphur-containing tiles can be washed with the ordinary detergents used on floors. However, when an alkaline condensing agent is used in making the resin it is preferable to wash the ground material with water or dilute acid, or otherwise extract the water-soluble constituents of the resin. With lime or barium hydroxide it is not as necessary to remove the condensing agent as when sodium or potassium hydroxide or carbonate is used, since the calcium and/or barium compounds remaining eventually become insoluble on contact with air.

Another feature of importance is that of reducing the inflammability of sulphur. Elemental sulphur is, of course, very easily ignited, burning with a blue flame which gives off the disagreeable odor of sulphur dioxide. By incorporating the sulphur resin the inflammability of the sulphur may be greaty reduced or even entirely suppressed, resins formed from phenols and a high proportion of sulphur chloride being more fire resistant than those made from lower proportions. By further addition of a considerable proportion of mineral filler, inorganic pigments, and the like, the inflammability is further reduced. Hydrated fillers such as highly hydrated calcium sulphate (or the ordinary hydrate, gypsum), which when heated evolve water vapor and act as flame quenchers, are useful in lowering the inflammability of sulphur mixtures. For highest efficiency, incorporation of such fillers must be done at a temperature below the dissociation point of the hydrate. Furthermore, when a suitably colored sulphur composition is used in a relatively thin layer as a tread veneer on a thicker non-sulphur (e. g., asphalt) backing, the inflammability of the composite tile tends to become little greater than that of the asphalt base itself.

Since the composition should preferably be worked out into sheeted form by rolling on milling rolls, it is desirable to have the sulphur in as rubbery a state or condition as possible and at least a temporary state of rubberiness may be secured for sheeting purposes by converting the sulphur into the plastic state as, for example, by heating the sulphur to a temperature of over 160° C. The temperature required to form plastic sulphur is, however, usually higher than that to which the sulphur resin should be subjected as the latter tends to decompose to some extent at those temperatures at which sulphur becomes plastic. Accordingly the sulphur may be heated to a temperature of, say, between 160° and 200° C. to convert it to the plastic state. Then it is cooled to about 150° C., the sulphur resin added and the mixture well stirred. At a temperature as high as about 160° C. the resin does not discolor rapidly, but melts and dissolves in the sulphur to yield resinated sulphur, a quantity of resin usually of from 10 to about 25 per cent based on the weight of the sulphur being adequate to reduce or eliminate the crystallizing action of sulphur, sufficiently for the present purpose. A resinated sulphur obtained in this way may then be incorporated with a sufficient quantity of mineral filler, such as chalk, clay, powdered gypsum, and particularly asbestos fiber or a mixture of a powdered mineral filler, such as clay, with a mineral fiber, such as asbestos, the proportions of the mineral filler to the resinated sulphur being such that preferably a maximum of filler is present to reduce inflammability of the resinated sulphur as low as possible but not such an amount of filler as would preclude suitable sheeting of the composition. But it is to be understood that the use of combustible fillers, as comminuted wood (dyed to some particular color, if desired) is still within the scope of the invention, where the combustible character of the wood would not be objectionable, or where the wood has been rendered fire-resistant.

Before being added to the resinated sulphur the filler is preferably preheated in order not to cool the mix unduly and render mixing difficult. When the filler has been incorporated the mixture is passed through sheeting rolls, warm or cold depending upon the plasticity of the mix. Or, the fillers can be incorporated with the binder on mixing rolls which are heated sufficiently to soften the mass. Sudden quenching of a hot resinated-sulphur mixture has the effect of prolonging its period of plasticity, that is, lengthening the time required for the sulphur to revert from the plastic to the brittle state and allowing a greater interval during which the material can be worked on rolls. The hot plastic mass can be plunged into cold water in order to preserve its plasticity and in this wet condition it can be sheeted. After a time depending upon the proportion of sulphur and sulphur resin, the sheeted material becomes hard. Using more of the resin slows down the hardening of the sulphur. However, a condition of plasticity at the time of laying the floor on a slightly uneven foundation is important since it enables the tile to conform to the surface upon which it is to rest without danger of forming pockets underneath and breaking when a downward force is applied. The cementing composition which may be used to fasten the tile to the foundation partly offsets the unevenness of the foundation.

In a similar manner a suitable asphalt or analogous bituminous stock may be mixed with like or related filling material, such mixing of the asphalt with its component of filler being carried out separately from the making of the sulphur-bearing composition. Fragments or biscuits of the black or dark-colored asphalt composition and of the lighter and possibly pigmented sulphur composition are then fed to sheeting rolls (which may be heated if desired to about 100° C. to 150° C.) and as these two component stocks each soften and spread under the pressure of the rolls they become pressed together to form sheets in which the sulphur component and the asphalt component are firmly cemented together. Afterwards the sheet may be cut into squares of, say, 6 inches on the side, or into any other suitable form desired for laying on floors to establish an appropriate colored pattern or effect.

In some cases instead of rolling the stock to produce a striated or jaspe effect I may make separate squares, rectangles, or other geometrical shapes entirely from the pigmented sulphur composition and others from the asphalt material and the resulting floor tile may then be laid in alternating fashion to produce any desired color effect on the finished floor.

The following examples are given as illustrative of this invention. Parts are by weight.

*Example 1.*—One hundred parts of meta-para-cresol and 2 parts of phosphoric acid were dissolved in 100 parts of toluene in a flask connected with a reflux condenser. The solution was stirred and 425 parts of sulphur chloride was added at such a rate that the reaction was vigorous but not violent. After all the sulphur chloride had been added and evolution of hydrogen chloride had diminished the mixture was blown with steam to remove the solvent and bodies which impart an odor to the resin. The resin was then poured out and allowed to cool. Further purification was accomplished by grinding the resin and digesting with warm water. The resin when dry was a light yellow powder of mild odor.

A mixture of 1 part of the above resin and 5 parts of sulphur was heated to 170° C. in order to obtain a plastic mass of resinated sulphur. Twelve parts of finely divided clay, previously heated to 170° C., was added and mixed in thoroughly. The composition was then passed through cold rolls and worked out into a smooth sheet about ¼ inch in thickness. The cold sheet was somewhat flexible when first prepared but became hard and tough within a few hours.

*Example 2.*—A cresol-sulphur chloride resin was made using less sulphur chloride than in Example 1. To 100 parts of cresol and 2 parts of phosphoric acid in 75 parts of toluene contained in a flask attached to a reflux condenser, 290 parts of sulphur chloride was added while the mixture was stirred. When evolution of hydrogen chloride had ceased, the solvent was removed by steam distillation and the resin in finely divided form was digested in warm water until substantially free from acid.

One part of the cresol resin was mixed with 5 parts of sulphur and heated, with stirring, to fusion. Six parts of clay was stirred in, the mass being held at about 160° C. until the filler was thoroughly incorporated. The resulting mass was passed through rolls heated to about 150° C. The rolls are preferably lubricated with an oil or wax, or they may be dusted with a substance such as zinc stearate, to prevent sticking. A sheet was formed with a smooth surface. The color was light brown instead of light yellow (the normal color of the resinated sulphur) due to the relatively high temperature at which the material was worked. For lighter colors it is necessary to manipulate the resinated sulphur-mix at a lower temperature.

Tiles made according to the above example were hard and resistant to washing. Also the odor was very mild. However, a fragment when held in the flame of a match ignited more readily than the product of Example 1, which contains a more highly sulphurized resin. Fire resistance can be improved by increasing the proportion of highly sulphurized resin and/or by using an influential amount of a hydrated filler.

*Example 3.*—A xylenol-sulphur chloride resin was made as follows: To a solution of 150 parts of mixed xylenols in 100 parts of benzene in a flask attached to a reflux condenser, there was added 153 parts of sulphur chloride at such a rate that the benzene boiled gently. After all the sulphur chloride had been added and evolution of hydrogen chloride had ceased, steam was passed in to remove the solvent and reduce the odor of the resin.

A mixture of 9 parts of sulphur and 6 parts of the xylenol resin was heated to 160 C., the resin dissolving in the sulphur to form a homogeneous melt. When the resinated sulphur had been allowed to cool to 115° C., 22 parts powdered gypsum, previously heated to 90° C., was mixed in and the mass was passed through cold rolls. The composition rolled out to form a smooth, light yellow sheet. When first made the sheet was somewhat pliable but hardened in the course of a day. The tile made in this way was resistant to burning. That is, a match flame held under a fragment did not cause ignition.

*Example 4.*—One hundred parts of cresylic acid was suspended in 200 parts of water containing 3 parts of phosphoric acid. Sulphur chloride was added slowly while the mixture was mechanically stirred, the rate of addition being adjusted so that the temperature was kept below the boiling point of water. After the chloride had been introduced, the water (hydrochloric acid solution) was decanted and the resin kneaded with hot water. This procedure results in a resin of only slight odor.

Six parts of the above resin was fused with 9 parts of sulphur and the molten mixture heated to 160° C. to convert the sulphur to the plastic stage. The resinated sulphur was then allowed to cool to 130° C. and 25 parts of powdered gypsum was mixed in, the addition of the filler producing further cooling. The mass was worked through cold rolls until the filler was thoroughly incorporated and the composition was in the form of a smooth, light brown sheet. Tiles made according to this formula ignited when held in a flame but ceased burning when removed from the flame.

If hydrated fillers such as gypsum are subjected to high temperatures they tend to lose water and become less effective in reducing combustion. Gypsum is stable up to about 110° C. In the above example the resinated sulphur was allowed to cool spontaneously to 130° C., but it is advisable, particularly with very large batches, to cool the mass artificially as by application of cold water to the exterior of the kettle. This avoids undue conversion to the brittle stage and facilitates rolling.

*Example 5.*—A phenol-sulphur resin was made by mixing 50 parts phenol, 100 parts sulphur and 10 parts potassium carbonate and heating first for 5 hours at 140° C. and then raising the temperature to 165° C. for 5 hours longer. When cool the product was hard, brittle, clear and of a light brown color. This resin is not miscible with molten sulphur but can be solubilized by means of a small quantity of sulphur chloride. One part of the resin and 3 parts of sulphur were mixed and heated to 120° C. Gradual addition of 0.16 part of sulphur chloride caused rapid solution of the resin and yielded a light-colored, homogeneous melt of very slight odor.

Fifteen parts of this resinated sulphur was heated to 130° C. and 20 parts of powdered gypsum was stirred in, heat being applied until the filler was uniformly incorporated. The hot pasty mass was worked between cold rolls until a smooth light-colored sheet was obtained. This was cut to the required size for tiles.

*Example 6.*—One part of cresol and 2 parts of sulphur were heated with 0.2 part potassium carbonate for 4 hours at 140° C., then for 5 hours at 165° C. The light brown resin thus obtained was mixed with 3 times its weight of sulphur and heated at 130° C., the resin dissolving in the sulphur upon the addition of 0.16 part of sulphur chloride based on the resin.

Fifteen parts of the resinated sulphur was heated to 160° C. and a mixture of 10 parts of powdered gypsum and 10 parts of powdered flint was stirred in. When the fillers were well incorporated the mass was immersed in water (at about 25° C.) and passed through cold rolls. The sudden cooling caused the sulphur to retain a highly plastic condition during rolling and the water acted as a lubricant so that a very smooth even sheet resulted.

In the present invention, the sulphurized phenolic resinous body acts to substantially delay or retard or in some cases to prevent the normal crystallization of the sulphur, such as normally would take place upon cooling molten sulphur. I use the term "inhibit" herein, to designate such retarding or delaying or prevention of such crystallization, because sulphur, when it has attained its normal crystallization, becomes weak and brittle. The prevention of rapidly acquiring a fully hard and especially brittle quality is of great importance in the production of floor tiles, under the present invention. For a considerable time at least, these floor tiles have a certain amount of "give" when walked upon, or when weighted unevenly, which is of importance when the foundation supporting the tiles is somewhat uneven.

In order to modify the naturally yellow color of sulphur compositions containing light-colored fillers, pigments can be mixed or milled in and any desired shade obtained. Pigments which do not react, or whose color is not affected by reaction with sulphur, are required. For whites zinc oxide, zinc sulphide, lithopone or titanox are suitable. Ultramarine can be used for blue or bluish-green shades. For grays and black lampblack or other form of carbon can be added along with asphalt if desired. Iron-containing pigments are unaffected at the preferred temperatures used for sheeting the tile composition and their incorporation produces shades of brown and red depending upon the type of pigment used (oxide, umber, sienna, etc.). Various dyes which are miscible with sulphur are also suggested.

For example, the following shades can be produced by adding the percentages of pigment noted to sulphur-filler mixtures which are otherwise light yellow (for example, the resinated sulphur-filler mix described in Example 3).

Bright blue—5.5% Ultramarine
Pale blue—3.6% Ultramarine
Bluish green—1.8% Ultramarine
Bright green—1.8% Ultramarine and 1.8% chrome green
Dark green—5% Chrome green
Plum—3.6% Indian red
Salmon—3.8% Red iron oxide
Old rose—3.6% Vermillion
Dark red—0.9% Para toner
Brown—3.6% Raw sienna.

Variegated effects are obtained by placing contrastingly colored masses simultaneously through rolls or by adding the colors to the resinated sulphur in such a way that they do not blend.

Various superficial colors can also be obtained by coating tiles with various compositions of the nature of oil and lacquer enamels which are not affected by and have good adherence to sulphur. For example, sulphur tiles can be coated with drying oil-phenolic resin enamels.

What I claim is:

1. A sheet-like product suitable as a floor covering which is made up of resinated sulphur as the essential binder, associated with comminuted calcium sulphate material which contains water of crystallization.

2. In the making of a resin containing chemically combined sulphur, the herein described process which comprises heating a phenolic body, elemental sulphur and an alkaline material, sufficiently to effect resinification, and thereafter acting upon the resinous body so formed, with sulphur chloride, whereby the miscibility of said resinous product with sulphur, is substantially enhanced.

3. A resinous sulphur chloride reaction product of a thermal reaction product of elemental sulphur with a phenol, said resinous sulphur chloride reaction product being compatible with elemental sulphur.

CARLETON ELLIS.